(12) United States Patent
Kobayashi et al.

(10) Patent No.: US 8,714,800 B2
(45) Date of Patent: May 6, 2014

(54) LIGHT-SOURCE DEVICE AND SIMULATED-SOLAR-LIGHT IRRADIATION DEVICE PROVIDED WITH SAME

(75) Inventors: Akiko Kobayashi, Osaka (JP); Kohji Minami, Osaka (JP); Hiroyuki Tadano, Osaka (JP); Norito Fujihara, Osaka (JP); Tamon Iden, Osaka (JP); Atsushi Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 46 days.

(21) Appl. No.: 13/520,413

(22) PCT Filed: Mar. 8, 2011

(86) PCT No.: PCT/JP2011/055363
§ 371 (c)(1),
(2), (4) Date: Jul. 3, 2012

(87) PCT Pub. No.: WO2011/135929
PCT Pub. Date: Nov. 3, 2011

(65) Prior Publication Data
US 2013/0033847 A1    Feb. 7, 2013

(30) Foreign Application Priority Data

Apr. 27, 2010   (JP) .................. 2010-101630

(51) Int. Cl.
*G02B 6/00* (2006.01)
*F21V 7/00* (2006.01)
(52) U.S. Cl.
USPC ............... 362/558; 362/1; 362/299; 362/301

(58) Field of Classification Search
USPC ......... 362/1, 2, 555, 558, 298, 299, 300, 301, 362/302, 303
See application file for complete search history.

(56) References Cited

U.S. PATENT DOCUMENTS

| | | | |
|---|---|---|---|
| 5,764,845 | A | 6/1998 | Nagatani et al. |
| 5,799,126 | A | 8/1998 | Nagatani et al. |

(Continued)

FOREIGN PATENT DOCUMENTS

| | | |
|---|---|---|
| JP | 07-098416 | 4/1995 |
| JP | 2003-028785 | 1/2003 |

(Continued)

OTHER PUBLICATIONS

International Search Report for PCT/JP2011/055363 (Jun. 7, 2011).

*Primary Examiner* — Laura Tso
(74) *Attorney, Agent, or Firm* — Edwards Wildman Palmer LLP; David G. Conlin; Steven M. Jensen

(57) ABSTRACT

The present invention provides a light source device for emitting concentrated light, which is prepared by concentrating light emitted from a light source, including: the light source; a reflective box in which the light source is provided; a plurality of light guides having a circular column shape or a polygonal column shape and having two end surfaces being different in area; and light separating means, the reflective box having a plurality of openings, each opening being provided with one of the light guides in such a way that the end surface smaller in area faces the light source, and each light separating means being provided at a position between the adjacent ones of the openings. With this, a small-sized light source device for emitting light with high output and high directivity, and a simulated solar light irradiation device including the same are provided.

8 Claims, 12 Drawing Sheets

(56) References Cited

U.S. PATENT DOCUMENTS

| | | | |
|---|---|---|---|
| 7,195,386 B2* | 3/2007 | Imade | 362/551 |
| 7,611,271 B2* | 11/2009 | Meis et al. | 362/551 |
| 7,837,371 B2* | 11/2010 | Grotsch et al. | 362/555 |
| 7,963,668 B2* | 6/2011 | Yin et al. | 362/244 |
| 8,545,078 B2* | 10/2013 | Kim | 362/576 |
| 2004/0090602 A1 | 5/2004 | Imade | |
| 2006/0152691 A1 | 7/2006 | Imade | |
| 2006/0244931 A1 | 11/2006 | Imade | |
| 2007/0109501 A1 | 5/2007 | Imade | |
| 2007/0121086 A1 | 5/2007 | Imade | |
| 2007/0211487 A1* | 9/2007 | Sormani | 362/545 |
| 2012/0014085 A1* | 1/2012 | Minami | 362/2 |
| 2012/0033399 A1 | 2/2012 | Fujihara | |
| 2012/0075829 A1* | 3/2012 | Li et al. | 362/1 |
| 2012/0134131 A1* | 5/2012 | Nakamura et al. | 362/2 |

FOREIGN PATENT DOCUMENTS

| | | |
|---|---|---|
| JP | 2006-310321 | 11/2006 |
| JP | 2011-003474 | 1/2011 |
| WO | 2010/146731 | 12/2010 |

* cited by examiner

LIGHT-SOURCE DEVICE AND SIMULATED-SOLAR-LIGHT IRRADIATION DEVICE PROVIDED WITH SAME

TECHNICAL FIELD

The present invention relates to a light source device for irradiation simulated solar light, and a simulated solar light irradiation device provided with the same.

BACKGROUND ART

Recently, a demand for a device capable of irradiating simulated solar light, that is, artificial light similar to solar light has been increased. Especially, solar battery technology has been advanced and popularized so fast. As a result, there is a high demand for a device capable of irradiating highly accurate simulated solar light usable in inspection, measurement, and experiment. A main aspect required for such simulated solar light is to have a luminescence spectrum similar to that of natural solar light.

Patent Literature 1 discloses one example of a simulated solar light irradiation device. This simulated solar light irradiation device is configured to include (i) a lamp housing which has a light irradiation surface having an area smaller than an irradiation range of simulated solar light, an optical filter installed on the light irradiation surface, a lamp such as xenon lamp installed inside the lamp housing, and (ii) a reflective plate provided to face the optical filter of the lamp housing, wherein an irradiation target on an appropriate mount is placed to face against a reflective surface of the reflective plate, the lamp is turned on to emit simulated solar light, which then passes through the optical filter so as to be reflected and diffused by the reflective plate, thereby irradiating the irradiation target with the simulated solar light thus reflected and diffused.

By configured as such, a simulated solar light irradiation device employing a diffused light irradiation technique can be downsized by having a smaller installation area for the optical filter, and have a longer diffusion optical path necessary for achieving uniform irradiation distribution.

However, the technique of Patent Literature 1 does not control directivity (radiation angle) of the light passing through the optical filter. Because of this, an optical filter made from a multilayered film and having an incident angle dependency can not fully exercise its capacity when the optical filter is adopted in the technique of Patent Literature 1. This leads to such a problem that simulated solar light having a desired luminescence spectrum cannot be emitted.

A light source device to solve this problem has been developed. Patent Literature 2 discloses a light guide applicable to various types of simulated solar light irradiation devices and a light source device provided with the light guide.

FIG. 12 is a schematic cross sectional view of a light source device described in Patent Literature 2. This device is configured such that a linear light source constituted by a fluorescent tube is placed inside a reflective box whose inner wall is covered with a silver film, and the reflective box has openings provided on a surface of the reflective box at constant intervals along the linear light source. Each opening is provided with the light guide tapered in shape, so that light enters the light guide from a smaller-area end surface and outgoes from a larger-area end surface. The light entering from the incident end surface reaches an outer wall of the light guide. Then, the light is totally reflected repeatedly on the outer wall, thereby being gradually converted into a light perpendicular to the outgoing end surface, and finally being outputted from the outgoing end surface. By this, it is makes it possible to highly efficiently obtain outgoing light having a light directivity, irrespective of a light emission characteristics of the light source.

With this device, it is possible to obtain light with high directivity more highly efficiently by using a plurality of light guides. Moreover, the use of this light source device makes it possible to enter the directivity-controlled light into the optical filter, thereby making it possible to obtain simulated solar light having a desired luminescence spectrum.

CITATION LIST

Patent Literatures

Patent Literature 1
Japanese Patent Application Publication, Tokukai, No. 2003-28785 A
Patent Literature 2
Japanese Patent Publication, No. 3383412 B

SUMMARY OF INVENTION

Technical Problem

Because the light guides capable of highly efficiently emitting light with high directivity are used in Patent Literature 2, it is possible to control the directivity of the light outgoing from the respective light guides in Patent Literature 2, but there is a risk that, in case where the light guides are arranged as illustrated in FIG. 12, a mixture of the light outgoing from every part of the light guides is emitted out of the openings of the reflective box, so that each light guide receives light of different light intensity or different light directivity, depending on positional relationship between the opening for the light guide and the light source. To solve this problem, it is necessary to perform positioning and adjustment for the openings, light source, and light guide. However, it is difficult to perform such positioning and adjustment once the light source device is assembled. Further, the difficulty in positioning and adjustment is also a problem when the position of the light source is changed due to replacement of the light source, for example.

If a single light guide is used for easy adjustment, the light guide should have a size large enough for the light source. Especially, the light guide has a large size when the light source is a linear light source, thereby causing the light source device to have a large size.

The present invention was accomplished in view of the aforementioned problem, and an object of the present invention is to provide a small-sized light source device being capable of easily adjusting light intensity and directivity of light entering light guides, and emitting light having a high directivity and a high output. Moreover, an object of the present invention is to provide a simulated solar light irradiation device being provided with the light source device and being capable of irradiating simulated solar light having a desired luminescence spectrum.

Solution to Problem

A light source device according to the present invention is a light source device for emitting concentrated light, which is prepared by concentrating light emitted from a light source, comprising: the light source; a reflective box in which the light source is provided; a plurality of light guides having a circular column shape or a polygonal column shape and having two end surfaces being different in area; and light separating means, the reflective box having a plurality of openings, each opening being provided with one of the light guides in such a way that the end surface smaller in area faces the light source, and each light separating means being provided at a position between the adjacent ones of the openings.

Moreover, a light source device according to the present invention is a light source device for emitting concentrated light, which is prepared by concentrating light emitted from a light source, comprising: the light source having a plurality of light emitting sections, reflective boxes inside of which contains the light source, a plurality of light guides having a circular column shape or a polygonal column shape and having two end surfaces being different in area; and each reflective boxes having a plurality of openings and having a hole or holes for passing the light source therethrough, the reflective boxes and the light guides being equal to the light emitting sections in number, and each opening being provided with one of the light guides in such a way that the end surface smaller in area faces the light source.

Moreover, a simulated solar light irradiation device according to the present invention is a simulated solar light irradiation device for irradiating simulated solar light toward an irradiation target, comprising: any one of the light source devices described above, and a spectral modifying member provided at a position at which the spectral modifying member receives the light emitted from the light source device, the spectral modifying member being configured to attenuate a spectrum in a particular wavelength band in the received light, and emit the light thus attenuated in the spectrum.

For a fuller understanding of the nature and advantages of the invention, reference should be made to the ensuing detailed description taken in conjunction with the accompanying drawings.

Advantageous Effects of Invention

According to a light source device of the present invention, it is possible to provide a small-sized light source device being capable of easily adjusting light intensity and directivity of light entering light guides, and emitting light having a high directivity and a high output. Moreover, by using the light source device according to the present invention, it is possible to provide a simulated solar light irradiation device being capable of irradiating simulated solar light having a desired luminescence spectrum.

DESCRIPTION OF EMBODIMENTS

Figure 1:
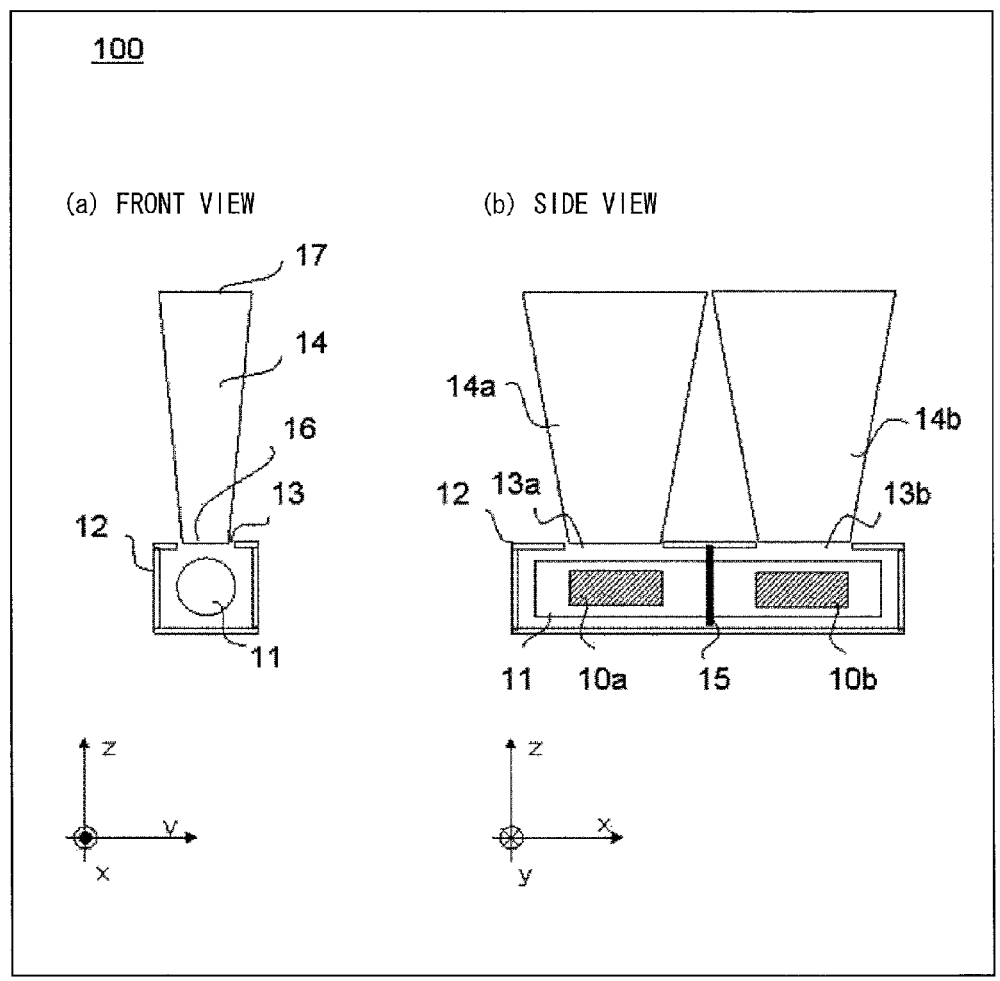
FIG. 1 is a schematic cross sectional view illustrating a light source device according to Embodiment 1.

In the following, embodiments of the present invention are described. In the drawings of the present invention, like reference numerals indicate like portions or corresponding portions.

Embodiment 1

Embodiment 1 according to the present invention is described below, referring to FIGS. 1 to 7. In the present embodiment, a light source device in which light from a light source having two light emitting sections is emitted after its directivity is increased by a light guide is described in details. In the drawings, the references "x", "y", and "z" indicates x axis, y axis, and z axis, respectively.

FIG. 1 is a front view and a side view illustrating main configuration of a light source device 100 according to Embodiment 1. As illustrated is (b) of FIG. 1, the light source device 100 has a light source 1 having two light emitting sections 10a and 10b, a reflective box 12, openings 13a and 13b provided on a surface of the reflective box 12, light guides 14a and 14b, and a partition board 15. The light source 11 is a non-uniform intensity light source having two light emitting sections 10a and 10b. The light source 11 is placed inside the reflective box 12 whose internal wall is covered with reflective coating. As later described in detail, the non-uniform intensity light source is a light source having a series of filament portions in which, for example, a metal (tungsten) thin line is coiled and gathered densely.

The reflective box 12 has openings 13a and 13b being equivalent in size with cross sections of incident surfaces 16 of the light guides 14a and 14b. The openings 13a and 13b are provided with the light guides 14a and 14b, respectively in such a way that their incident surfaces 16 face toward the light emitting section 10a and 10b inside the reflective box 12, respectively. The partition board 15 is provided almost in a middle of the light emitting section 10a and 10b in such a way that the partition board 15 is around an outer tube of the light source 11. The partition board 15 prevents light of the light emitting section 10a from entering the light guide 14b and prevents light of the light emitting section 10b from entering the light guide 14a. That is, light having more uniform directivity distribution is emitted to the light guides 14. Moreover, by placing partition board 15 almost in the middle of the light emitting section 10a and 10b, light intensity emitted through the openings 13a and 13b, respectively can be adjusted to be almost identical with each other.

Part of the light emitted from the light emitting sections 10a and 10b of the light source 11 enters the light guides 14a and 14b directly from the openings 13a and 13b, respectively. The rest of the light is reflected on the reflective coating on the inner wall of the reflective box 12 repeatedly, and then enter the incident surfaces 16 of the light guides 14a 14b from the openings 13a and 13b, respectively at last. The light having entered into the light guide 14a or 14b is repeatedly reflected on a side surface of the light guide 14a or 14b. Consequently, the light is emitted from the output surface 17 as light having high directivity. Functions of the sections are described below.

Figure 2:
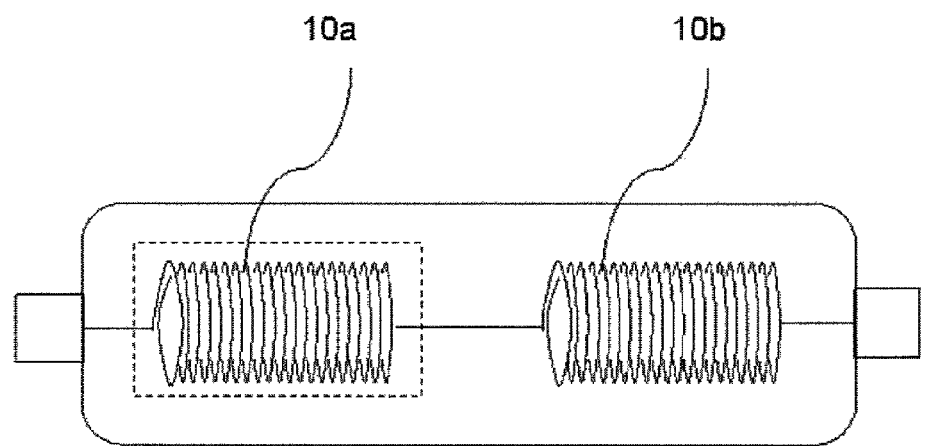
FIG. 2 is a schematic view illustrating a light source according to Embodiment 1.

FIG. 2 is a view illustrating one example of the light source 11. The light source 11 is a halogen lamp of a tubular shape, but is preferably a non-uniform intensity light source, in which intensity is partially intensified and partially attenuated by coiling the filament partially densely and partially coarsely as illustrated in FIG. 2. In such non-uniform intensity light source, the light is emitted from the light emitting sections 10a and 10b in which the filament is coiled densely. The light emitting sections 10 are a filament gathered by coiling a metal (tungsten) thin line densely. In the present embodiment, for example, the light emitting sections 10 are a coil of filament of 2 mm in diameter, the coil having φ6 mm and a length of 40 mm. The light emitting sections 10a and 10b are identical with each other in size (density). In this case, the light guides 14 are identical with each other in shape, thereby having a uniform light amount of the light emitted from the respective light guides 14. If it is desired to emit different light amounts from the respective light guides 14, this can be done by changing the size and density of the filament as appropriate. Moreover, in this case, the size and shape of the light guides 14 may be changed as appropriate.

The filament emits light intensely when electrified. Especially the portions in which the filament is coiled and gathered densely emit light highly intensely. Thus, the portions in which the filament is coiled and the other portions emit different amounts of light. Therefore, the portions in which the filament is coiled can be regarded as the light emitting sections 10a and 10b being different from the other portions. The number of the light emitting sections 10 may be two as in the present embodiment, or more than two.

As described above, by using the non-uniform intensity light source having a plurality of light emitting sections 10 in the light source, it becomes unnecessary to provide electrodes on both ends of each of the light emitting sections 10, thereby saving spaces for the electrodes, compared with a case where a plurality of light sources 11 having one light emitting section 10 in one light source. Thus, this configuration can reduce a space occupied by the light source 11. Moreover, by applying between electrodes a voltage increased by multiples of the number of the light emitting sections 10, light output per light emitting section can be equivalent to one attained by use of the general light sources 11 individually. Thus, the use of the non-uniform light source can reduce the space occupied by the light source 11, thereby making it possible to downsize the light source device 100.

The reflective box 12 is constituted by a member having a reflective inner surface (inside of which the light source 11 is provided). For example, the inner surface is covered with reflective coating. The light emitted from the light source 11 is emitted to the light guide 14 through the opening 13 directly, or is reflected repeatedly on the inner surface of the reflective box 12 and then emitted to the light guide 13 through the opening 13 at last. Thus, the reflective coating is preferably one having a higher degree of reflection. Reflective coating with a higher degree of reflection causes less light attenuation in the light reflection inside the reflective box, thereby making it possible to attain a greater efficiency in entering the light into the light guide 14. In the present embodiment, the light source 11 is a halogen lamp, thereby having a spectral radiant characteristic being higher for long wavelengths. In this case, for example, reflective coating made from gold is preferable, because the reflective coating made from gold has a high degree of reflectance even for long wavelengths. It is preferable that the reflective coating is selected to be suitable for the wavelength band of the light source 11 to use and necessary wavelength band in such a manner.

As to relationship between the openings 13 and the light emitting sections 10 in terms of their shapes, for example, the openings 13 have a rectangular shape having such a size large enough for the light emitting section 10 laid along to pass through (for example. 45 mm in length and 10 mm in width). By giving the openings 13 a size slightly larger than that of the light emitting sections 10, it becomes possible to obtain a greater amount of light reaching to the openings 13 directly from the light emitting sections 10, respectively.

It is preferable that the openings 13 have a shape similar to a transverse cross section of the light emitting sections 10 and a size equal to or slighter larger than that of the transverse cross section of the light emitting sections 10 as described above. Moreover, as later described, it is preferable that each opening section 13 is provided substantially in a center of a corresponding space partitioned by the partition board 15 in the reflective box 12, and substantially right above the corresponding light emitting section 10. The opening section 13 provided substantially right above the light emitting section 10 allows light having more uniform directivity to emit toward the light guide 14, thereby allowing the light guide 14 to emit light having more uniform directivity.

Moreover, as to relationship between the openings 13 and the incident surfaces 16 of the light guides 14 in terms of their shape, a large amount of light does not enter the incident surface 16 but leaks outside directly from the opening sections 13 if the shape of the opening 13 is significantly larger than the incident surface 16. This causes reduction in light intensity of light emitted from the output surface 17. Moreover, if the incident surface 16 is significantly larger than the opening 13, the light intensity of light emitted from the openings section 13 is reduced, whereby the incident surface 16 cannot receive a sufficient amount of light. Accordingly, it is preferable that the shapes of the openings 13 and the incident surfaces 16 of the light guides 14 are substantially identical. Moreover, the larger the opening 13 is, the greater the amount of light entering the light guide 14 directly is, thereby allowing to enter a greater amount of light more efficiently. However, the larger the opening 13 is, the larger the incident surface 16 of the corresponding light guide 14. This requires the light guide 14 to be larger. Therefore, it is preferable that the size of the openings 13 is chosen in consideration of desired light emission efficiency, desired directivity, and desired device size.

Figure 3:
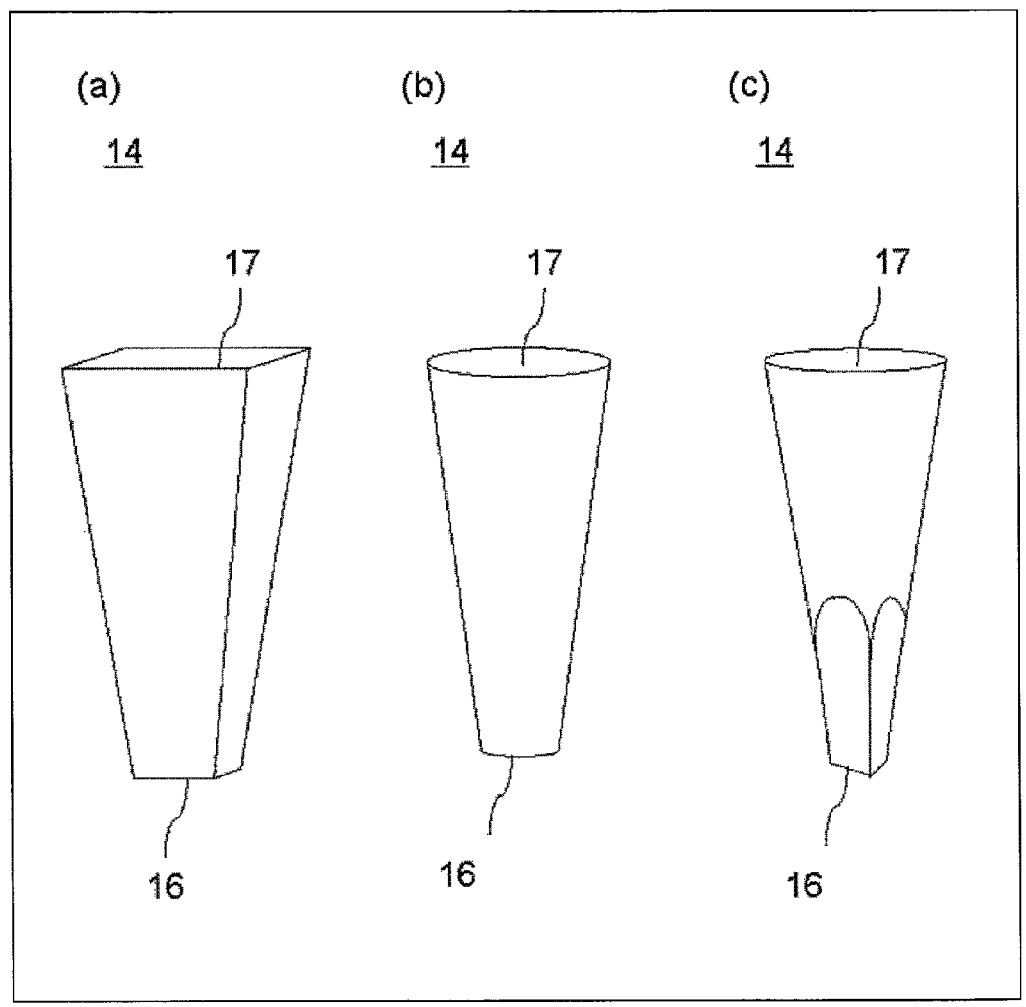
FIG. 3 is a perspective view illustrating a modification of a light guide.

FIG. 3 illustrates examples of shape of the light guides 14 in the present embodiment. The light guides 14 in the present embodiment have a quadrangular column shape as illustrated in (a) of FIG. 3, which have two surfaces opposing to each other and being different in area. The light guides 14 in the present embodiment are made from optical glass called BK7. The light guides 14 have an incident surface 16 having a size substantially equal to that of the openings 13. The size of the incident surface 16 is for example 45 mm in length and 10 mm in width. In this case, the output surface 17 is for example 85 mm in length and 19 mm in width. A distance from the incident surface to the output surface is 240 mm. In this case, the area ratio of the output surface to the incident surface is about 3.6. A greater the area ratio or a longer the distance from the incident surface 16 to the output surface 17, the greater directivity, the emitted light will have. In the present embodiment, the dimensions of the light guides 14 are determined to attain a directivity of +/−30 degrees or less.

Figure 4:
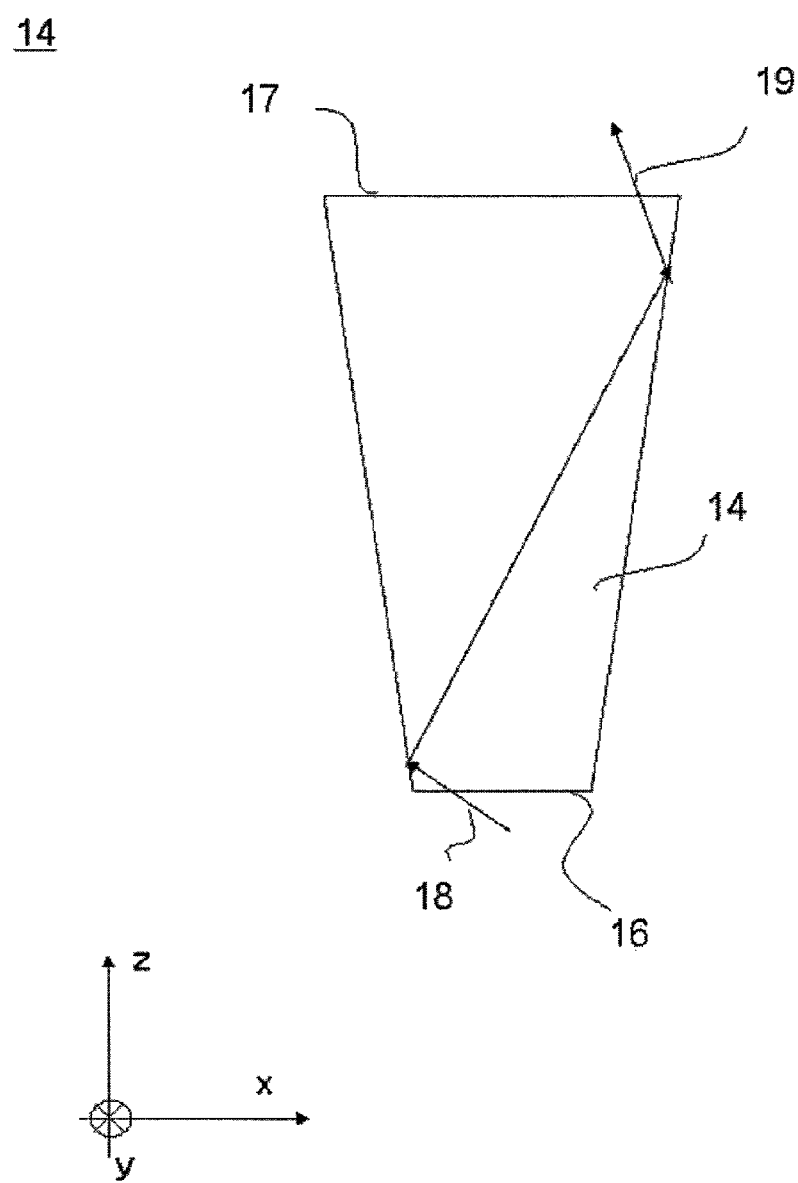
FIG. 4 is a schematic cross sectional view illustrating a light guide according to Embodiment 1.

FIG. 4 illustrates an optical path of the incident light in the light guide 14. For example, incident light 18 entering about a center of the incident surface 16 of the light guide 14 of (a) of FIG. 3 at incident angle of 60 degrees is repeatedly reflected on the outer wall of the light guide 14 as illustrated in FIG. 4 and then omitted from the output surface 17 as outgoing light 19 at an output angle of 25 degrees. As such, the light guide 14 of the present embodiment can emit light with high directivity in which the output angle is restricted to be within about 30 degrees. It is preferable that the light guides 14 are placed in such a way that their incident surfaces 16 and the corresponding openings 13 are coaxial. With such a configuration, it is possible to attain more uniform directivity distribution in the outgoing light emitted from the light guides 14.

More details on the user of the light guides 14 to obtain light with greater directivity are described below. As illustrated in FIG. 4, the incident light, which is light entering the light guide 14 directly from the light source 11 or diffused light entering the light guide 14 after being reflected by the reflective box 12, reaches the outer wall of the light guide 14 after entering the incident surface 16 at a certain angle. Because the light guide 14 is transparent by being made from the optical glass BK7, the incident light having entered the light guide 14 is gathered within critical angle of the light guide 14 and totally reflected in the light guide 14 according to the Snell's law on a refractive index ratio between the light guide 14 and its surrounding space. Then, the totally reflected light reflected on one side of the outer wall of the light guide 14 is reflected to another side of the outer wall of the light guide 14, and then totally reflected on the another side. Such reflection is repeated, thereby gradually converting the light perpendicular to the incident surface 16 (or the output surface 17). Then, the light is finally emitted from the output surface 17 as light with high directivity. Because the incident light of the light guide 14 is simply totally reflected, most of the incident light is emitted at last, thereby attaining high emission efficiency.

The light guides 14 are not limited to the ones described in the present embodiment, provided that the light guides 14 have a circular column shape or polygonal column shape, and have two end surfaces having different areas. For example, the light guides 14 may have a conical shape as illustrated in (b) of FIG. 3, or a polygonal column shape other than the rectangular column shape. Moreover, as illustrated in (c) of FIG. 3, the light guides 14 may have a shape, which is conical as a whole but has a rectangular column shape near the incident surface. As such, there are many variations in the shape of the light guides 14. An optimal shape, which can attain minimum light loss in optical connection between the light source device 100 and another optical device (that is, which can attain a maximum light emission efficiency) can be selected for the light guides 14. In selecting the shape of the light guides 14, the emission angle of the outgoing light can be restricted within a desired angle range by adjusting the area ratio between the incident surface 16 and the output surface 17 of the light guide 14, and the distance of the incident surface 16 to the output surface 17, thereby obtaining outgoing light having a desired directivity.

Moreover, the light guides 14 are transparent and made from the optical glass BK, for example. As alternatives, the light guides 14 may be made from an inorganic material such as quartz glass or superwhite glass, or may be made from an organic material such as acrylic resin. A material allowing the light entering the light guide 14 to efficiently travel from the incident surface 16 to the output surface 17 can be selected as the material of the light guides 14.

The partition board 15 (light separating means) may be made from any material that is not transparent to light. For example, it is preferable that the partition board 15 is a board whose two surface respectively facing the light emitting sections 10a and 10b are covered with the reflective coating covering the inner surface of the reflective box 12, or a board made from the same material as the inner surface of the reflective box 12. The partition board 15 has a side substantially equal to the side surface of the reflective box 12 (which surface is perpendicular to a longitudinal axis of the light source 11), so that the partition board 15 can separate the light of the light emitting section 10a from the light of the light emitting section 10b as much as possible. When the light emitting section 10a and the light emitting section 10b are substantially identical in size (density) and it is desired to emit a substantially equal amount of light from the light guides 14a and 14b, the partition board 15 is placed substantially at the middle of the light emitting section 10a and the light emitting section 10b. In this way, a substantially equal amount of light from the light guides 14a and 14b, thereby obtaining uniform outgoing light. Moreover, it is preferable that the partition board 15 is placed in such a way that the openings 13 of the reflective box 12 are located substantially at the centers of the corresponding spaces defined by the reflective box 12 and the partition board 15.

Figure 5:
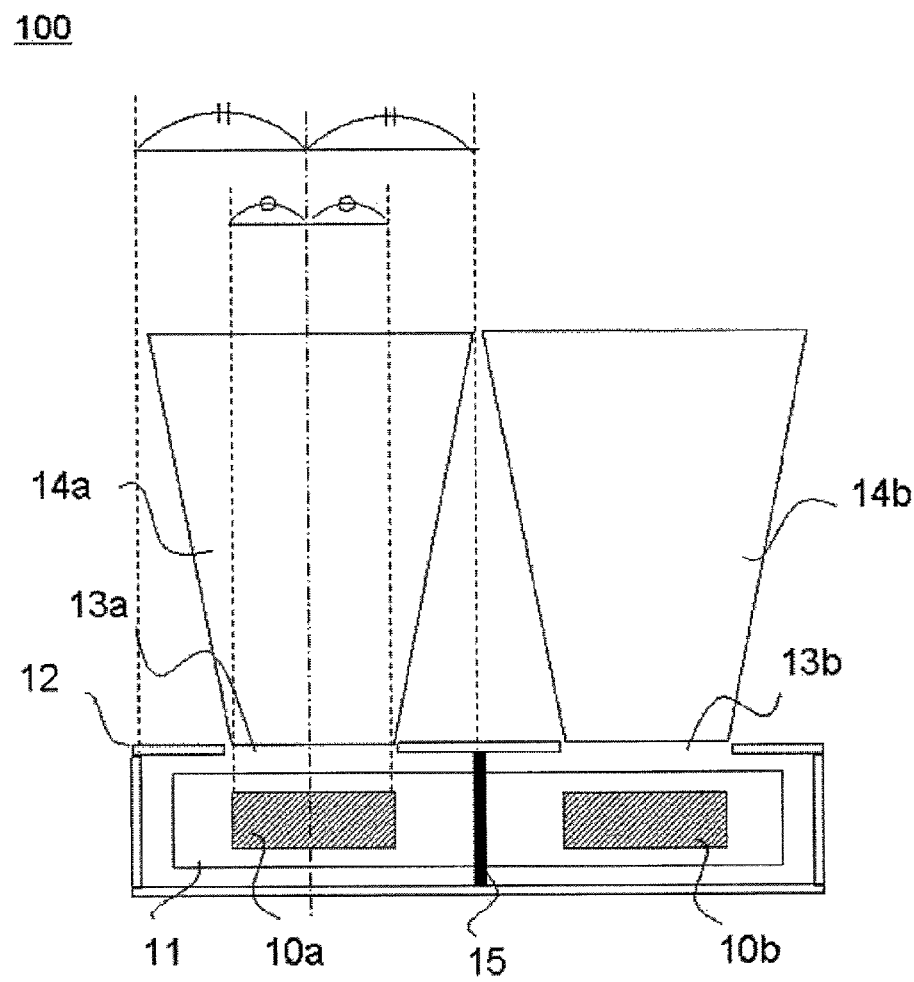
FIG. 5 is a schematic cross sectional view illustrating a light source device according to Embodiment 1.

FIG. 5 illustrates an example in which the partition board 15 is placed in such a way that the openings 13 of the reflective box 12 are located substantially at the centers of the corresponding spaces defined by the reflective box 12 and the partition board 15. By positioning the partition board 15 as such, the light emitting out of the light guide 14 can be light with uniform directivity having no bias. If there is enough space between the light emitting sections 10a and 10b, a plurality of the partition board 15 may be provided. The partition board 15 is positioned as appropriate, depending of the positional configurations and sizes of the reflective box 12, the openings 13, and the light emitting sections 10.

In order to confirm the effect of the present embodiment, the following simulation was conducted.

Figure 6:
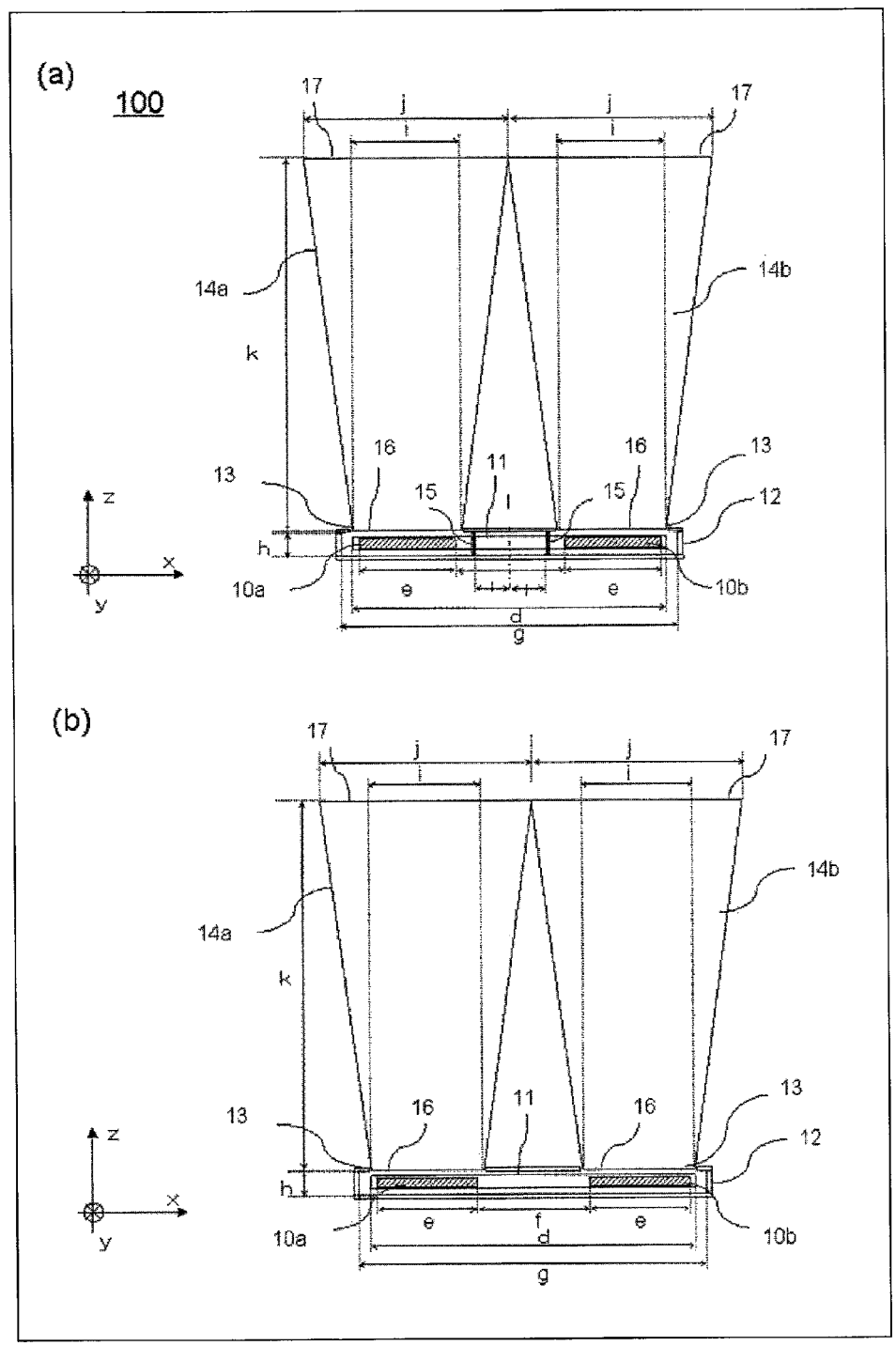
FIG. 6 is a cross sectional view of comparative simulation of the light source according to Embodiment 1.

(a) of FIG. 6 illustrates a light source device 100 according to the present embodiment. (b) of FIG. 6 illustrates a light source device 100 without the partition board 15.

A light source 11 of the light source device (a) has an outer shape of 8 mm in diameter and 130 mm in length d, and has two light emitting section 10a and 10b, whose diameter is 6 mm and length e is 40 mm. The light emitting sections 10a and 10b are arranged in series with an interval f of 45 mm along a longitudinal direction of the light source. A reflective box 12 has an internal space having a rectangular solid shape of 140 mm in length g and 15 mm in height h and width. The reflective box 12 has two openings 13, which are coaxial with the corresponding light emitting sections 10, and have a size of 46 mm in length and 10 mm in width. In each of the two opening sections 13, a light guide 14 is provided with its incident surface 16 facing the light emitting section 10 (the incident surface 16 has a length i of 45 mm and a width of 10 mm, and an output surface 17 has a length j of 85 mm and a width of 19 mm, and a distance k between the incident surface 16 and the output surface 17 is 240 mm). Inside the reflective box 12, two partition boards 15 are provided at respective potions 14 mm off rightward and leftward from a center 1 between the light emitting sections 10. That is, the openings 13 and the corresponding spaces defined by the reflective box 12 and the corresponding partition boards 15 are coaxial. The light source device (b) has a configuration identical with that of the light source device (a), except that the light source device (b) has no partition board 15.

By using the light source devices (a) and (b), directivity distributions of light emitted from the light guide 14a, which is one of the light guides 14, was calculated.

Figure 7:
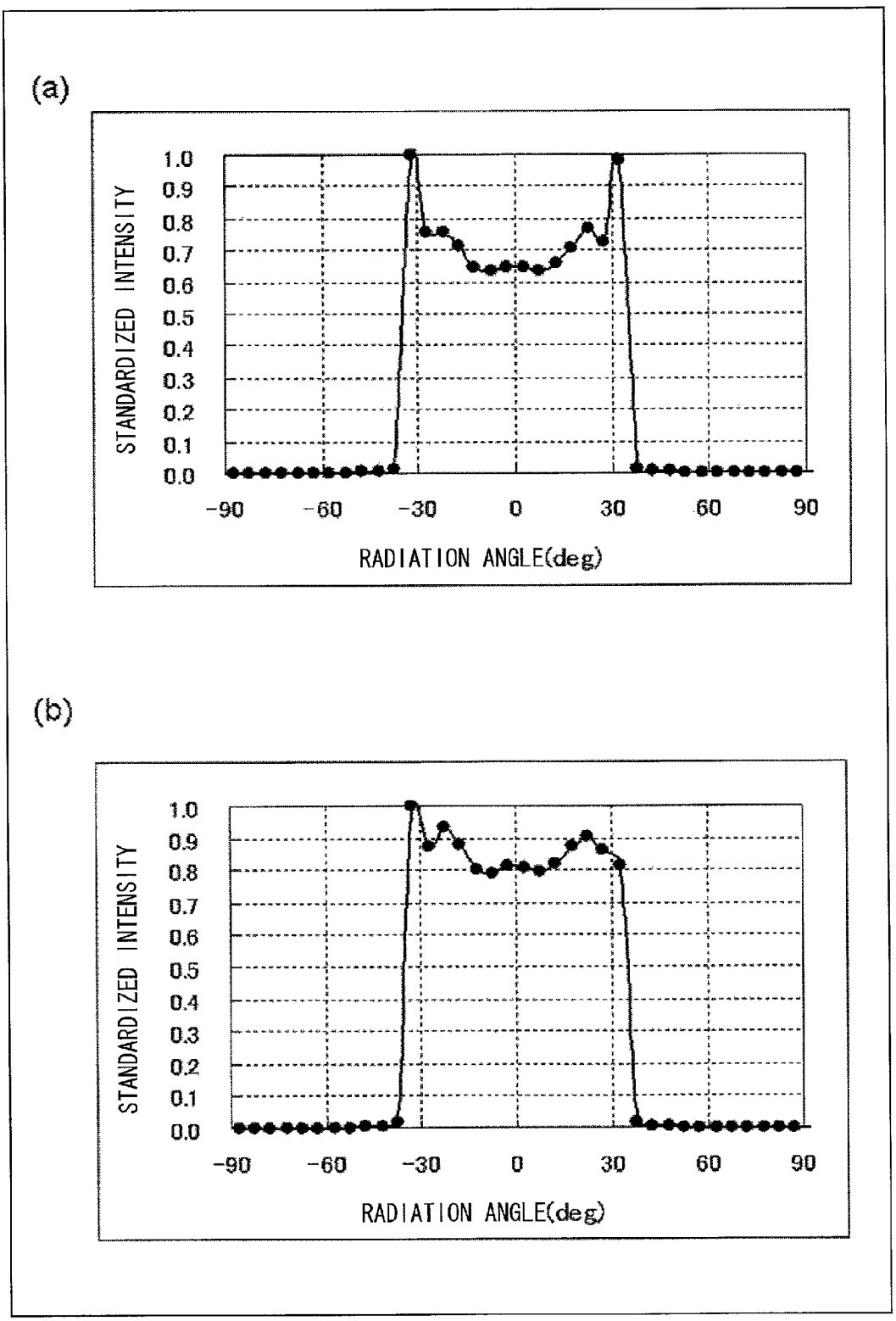
FIG. 7 is a graph illustrating a result of the comparative simulation of the light source according to Embodiment 1.

FIG. 7 illustrates directivity distribution along a longitudinal direction of the light emitting section 10. The horizontal axis shows radiation angle, and the vertical axis shows standardized intensity. (a) of FIG. 7 illustrates a calculation result for the light source (a) and (b) of FIG. 7 illustrates a calculation result for the light source (b). Taking 0 degree of the radiation angle as a standard, the directivity of the light in the light source device (b) is biased, but the directivity of the light in the light source device (a) is substantially line symmetric in the range of +/−30 degrees from 0 degree of the radiation angle, thereby having no bias in the directivity distribution.

As described above, the use of the light source device 100 of the present invention is configured such that light emitted to the light guides 14 has more uniform directivity due to the partition board 15. This allows to emit light with more uniform directivity from the light guides 14. Because each light guide 14 emits light with more uniform directivity, it is possible to emit uniform light from the plurality of light guide 14. On the other hand, if light without uniform directivity is emitted from a plurality of light guides 14 to a light receiving surfaces provided in a small distance from the light guides 14 as in (b) of FIG. 7, the light thus received on the respective light receiving surfaces are not uniform in illuminance, thereby causing non-uniform illuminance distribution. The non-uniform directivity means that light emitted at a certain angle is larger in light intensity than light emitted at the other angles. Thus, the non-uniform directivity tends to cause such non-uniform illuminance distribution. If the directivity is uniform, it becomes easy to attain uniform illuminance distribution among the light receiving surfaces.

As described above, the light source device 100 of the present embodiment is small in size but can irradiate light having high output and high directivity. Moreover, the light source device 100 can irradiate light having uniform directivity from each light guide 14. It should be noted that the present invention is not limited to the present embodiment, in which the light emitting sections 10 are two. The present invention is applicable to a light source having three or more light emitting sections 10. In this case, the opening sections 13 and the light guides 14 are provided as many as the light emitting sections 10 in order to attain a similar effect.

Even though the partition board 15 is positioned such that the opening sections 13 of the reflective box 12 are located substantially at the center of the corresponding spaces defined by the reflective box 12 and the partition board 15, in order to equalize the light amounts emitted from the adjacent openings 13 in the present embodiment, the partition board 15 may be positionally adjustable to increase or decrease the light amount from one of the openings 13, or to adjust bias in the directivity of the light entering the light guides 14. For example, in order to decrease a light amount from a certain opening 13, the partition board 15 is positioned closer to this opening 13 off the center, so as to reduce the space defined by the reflective box 12 and the partition board 15 for the opening section 13. As one alternative, for reduce the light amount coming from a certain light emitting section 10, the partition board 15 may be covered with a black coating on its surface facing the opening section 13 associated with the light emitting section 10 whose light amount is to be reduced, or may not be covered with the reflective coating on this surface, while the other surface of the partition board 15 is covered with the reflective coating.

As described above, the adjustment in the light amount from part of the opening section 3 or in the bias of the directivity of the light entering the light guide 14 can be quite easily performed by simply additionally providing the partition board 15 with a film such as the reflective coating, adjusting the installation position of the partition board 15, or adding another partition board 15. Thus, the positioning or positional adjustment of the opening sections 13, the light source 11, and the light guides 14 even after the assembly of the light source device or after the position of the light source 11 is changed, for example, due to replacement of the light source 11.

Embodiment 2

Next, Embodiment 2 is described below, referring to FIG. 8. Like members common to Embodiment 1 are labeled with like reference numerals and their explanation is omitted. The present embodiment is identical with Embodiment 1 in terms of the structure of the device, but a reflective box and light guides are different from those in Embodiment 1.

Figure 8:
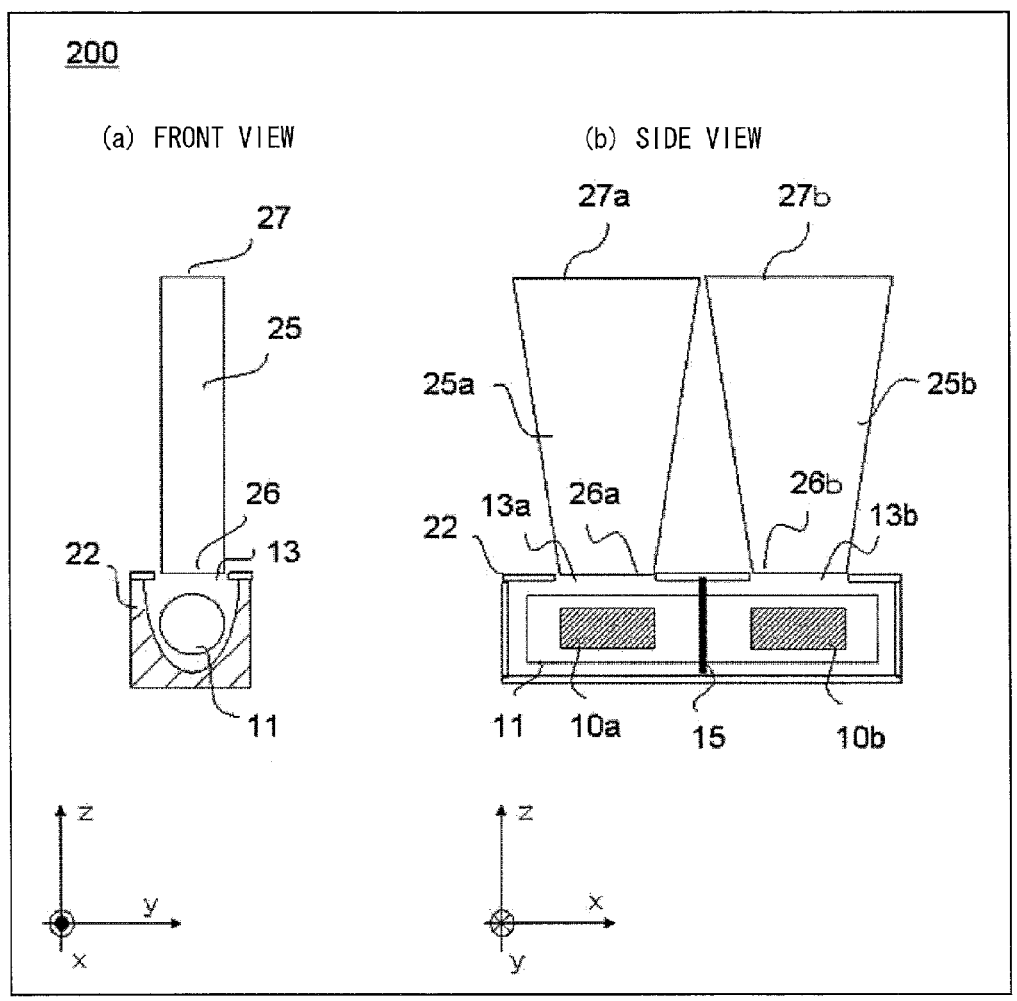
FIG. 8 is a schematic cross sectional view illustrating a light source device according to Embodiment 2.

In FIG. 8, a front view and a side view illustrate a main configuration of a light source device 200 according to Embodiment 2.

A reflective box 22 has a reflective surface along a longitudinal axis of a light source 11 having a tubular shape. The reflective surface has a cross section having a U-like shape to surround a surface of the light source 11 which does not face light guides 25. The U-like shape is preferably an oval surface, one of whose focal points is on the longitudinal axis of the light source 11, for example. In this case, part of the light emitted from the light source 11, which part does not enter the light guide 25 directly, can be concentrated into the light guide 25 by only one reflection. In this case, an opening 13 and an incident surface 26 of the light guide 25 are positioned near another focal point of the oval shape. By this, it is possible to further improve efficiency in entering the light into the light guide 25. Moreover, this configuration can improve directivity of the light entering the light guide 25 (directivity as to a direction perpendicular to the longitudinal axis direction of the light source 11). Further, less reflective coating is required to cover a U-like shaped surface of the reflective box 22, compared with the reflective box 12 having the box-like shape. This keeps production cost low even if reflective coating made from an expensive material such as gold is used.

Because the directivity of the light is improved along the direction perpendicular to the longitudinal axis direction of the light source 11 by the configuration of the reflective box 22 as described above, the light guides 25 may be configured to improve only the directivity along another direction (the longitudinal axis direction). That is, the light guides 25 illustrated in FIG. 8 as having a rectangular column shape having two pairs of slant surfaces may be configured to have a rectangular column shape and a pair of slant surfaces and a pair of non-slant surfaces facing along the longitudinal axis direction of the light source 11. As one alternative, the light guides 25 may have a rectangular column shape and a pair of slant surfaces and a pair of less-slant surfaces facing along the longitudinal axis direction of the light source 11. The light guides 25 may have such shapes, provided that the light emitted from the light guides have a desired directivity. By this, the light guides 25 can be smaller than the light guides 14 in Embodiment 1.

Embodiment 3

Next, Embodiment 3 is described below, referring to FIG. 9. Like members common to Embodiment 1 or 2 are labeled with like reference numerals and their explanation is omitted.

Figure 9:
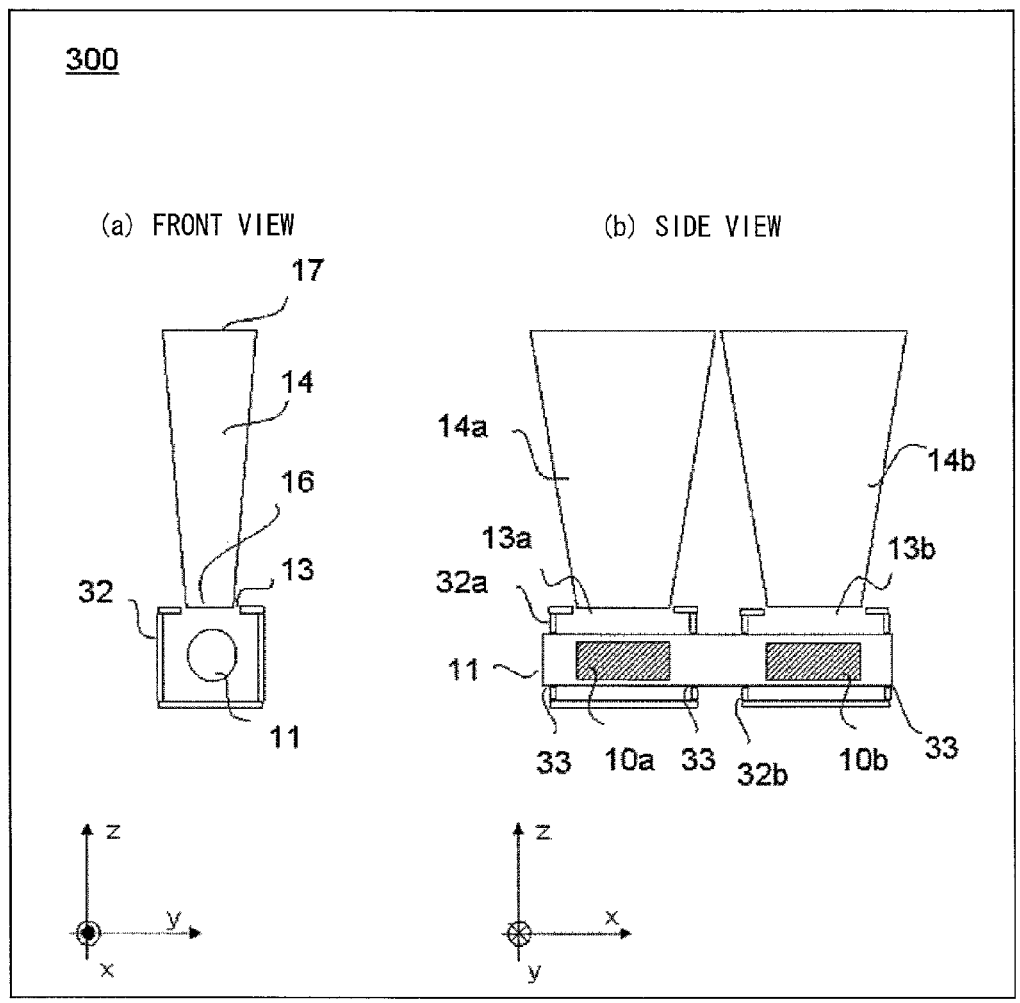
FIG. 9 is a schematic cross sectional view illustrating a light source device according to Embodiment 3.

FIG. 9 illustrates a light source device 300 according to the present embodiment. The light source device 300 is different from the ones in the previous embodiment in that the light source device 300 is provided with one reflective box 32 for every light emitting section 10.

The reflective boxes 33 in the present embodiment are not configured to surround the whole light source 11, but to surround the light emitting sections individually. Moreover, the reflective boxes 32 has two holes 33 for passing the light source 11 therethrough, in addition to opening sections 13 serving as intersections with the respective light guides 14. It is preferable that the holes 33 have a shape identical with an outer shape of the light source 11 but slightly larger in size than the light source 11, thereby eliminating a gap between the light source 11 and periphery of the holes 33 as much as possible, so that light loss in the light from the light source 11 is reduced as much as possible. Moreover, in order to attain more uniform directivity in the light from the respective light guides 11, it is preferable that ends of the light source are exposed out of the reflective boxes 32 as in the present embodiment. However, the ends of the light source may be contained inside the reflective boxes 32.

With this configuration, almost all of the light emitted from the light emitting section 10a is emitted to the light guide 14a via the opening 13a from an inside of the reflective box 32a, while almost no light from the light emitting section 10a passes through the opening 13b via the reflective box 32b adjacent to the reflective box 32a and then is emitted from the light guide 14b. That is, the reflective boxes 32 have a function of preventing light of a light emitting section 10 contained in a reflective box 32 from entering a light guide 14 associated with an adjacent reflective box 32 via the adjacent reflective box 32. At the same time, the reflective boxes 32 have a function of preventing light of an adjacent light emitting section 10 other than the light emitting section 10 contained in this reflective box 32 from entering this reflective box 32 and then being emitted to the light guide 14 associated with the light emitting section 10 contained in this reflective box 32.

Almost all the light emitted from the light source 11 is emitted from the light emitting sections 10. Therefore, the configuration in which the reflective boxes are provided to surround only the light emitting sections 10 does not cause much reduction in the light output from the light guide 14. In the present embodiment, the reflective boxes 32 also serve as the light separating means 15. By providing the reflective boxes 32 individually to the light emitting sections, it is possible to downsize the surroundings of the light source 11 compared with Embodiment 1. Moreover, because it is necessary to cover smaller areas inside the reflective boxes 32 with the reflective coating, it is possible to create the reflective boxes at lower cost. Moreover, in Embodiment 1, it is necessary to position the reflective box 12 in consideration of the positions of both the light emitting sections 10a and 10b and to position the partition board 15 at the position in the middle of the light emitting sections 10a and 10b, if the positional adjustment of the light emitting sections 10, the reflective box 12, and the partition board 15 is to cause the light guides 14 a and 14b to emit almost same amount of light. On the other hand, the reflective boxes 32a and 32b can be independently moved in the present embodiment, thereby making it easier to position the reflective boxes 32a and 32b respectively for the light emitting sections 10a and 10b. Therefore, the present embodiment can further improve the positioning in accuracy.

Embodiment 4

Embodiment 4 according to the present invention is described below, referring to FIGS. 10 and 11. The present embodiment describes one example of a simulated solar light irradiation device for irradiating simulated solar light to an irradiation target, the simulated solar light irradiation device including any one of the light source device described above. Like members common to the embodiments described above are labeled with like reference numerals and their explanation is omitted.

Figure 10:
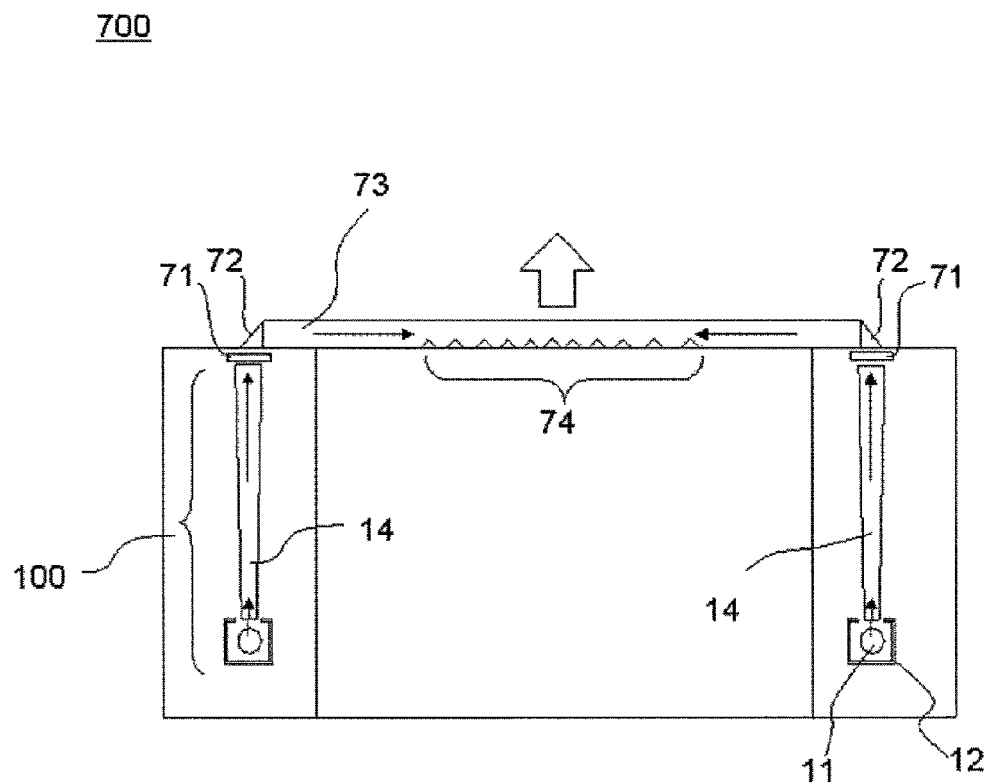
FIG. 10 is a schematic cross sectional view illustrating a simulated solar light irradiation device according to Embodiment 4.
Figure 10:
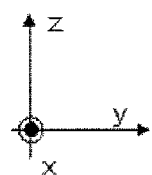

FIG. 10 is a view illustrating a main configuration of a simulated solar light irradiation device 700 according to one embodiment of the present invention. As illustrated in FIG. 10, the simulated solar light irradiation device 700 includes two light source devices 100, two optical filters (spectral modifying member) 71, two reflective mirrors 72, and one light guide plate 73. The light source devices 100 are for example, one described in Embodiment 1. The light source devices 100 include a light source 11, a reflective box 12, openings 13, light guides 14, and a partition board 15, as described above. Moreover, inside the light guide plate 73, a plurality of reflective grooves 74 (light reflecting means) are formed.

Next, operation of the simulated solar light irradiation device 700 according to the present embodiment is described. Light emitted from the light source 11 is reflected repeatedly on reflective coating provided on an inner surface of the reflective box 12, and then enter the light guide 14 via the opening section 13 at last. The light entering an incident surface 16 of the light guide 14 is totally reflected on slant outer walls of the light guide 14, whereby radiation angle of the light becomes closer to an angle perpendicular to the incident surface 16 or an output surface 17 of the light guide 14. As a result of such total reflection, the light guide 14 emits light whose radiation angle is controlled and thereby has a high directivity. For example, in case where the light source devices 100 in Embodiment 1 is used, the radiation angle is controlled to be within about 30 degrees.

The light emitted from the light source device 100 enters the optical filter 71, which attenuates light in a spectrum in a predetermined wavelength. Then, the light thus attenuated in the spectrum is emitted as the simulated solar light having a predetermined spectrum. The simulated solar light is reflect by the reflective mirror 72. This causes the simulated solar light to enter the light guide plate 73 from an end surface thereof. Because the surface of the light guide plate 73 has the large number of reflective grooves (light reflecting means) 74, the light is reflected by the reflecting grooves 74. Through the reflection, the light is emitted out of the light guide plate 73 toward the irradiation target.

Next, functions of the optical elements are described in more detail.

In the present embodiment, the light source devices 100 are ones described in Embodiment 1. Actually, the light source devices may be ones described in Embodiment 2 or 3, or the other ones according to the present invention. The light source devices 100 has a function of improving directivity to the light emitted from the light source 11, and entering the light with the improved directivity into the optical filter. The directivity is controlled to be preferably within 30 degrees in radiation angle, or more preferably within 20 degrees in radiation angle. This is because the optical filter 71 is angle-dependent. Further, by controlling the directivity of the light, it is possible to reduce light lost in the optical path between the light source devices 100 to the light guide plate 73 by going out of the optical path.

The optical filter 71 is provided near the output surface 17 of the light guide 14 of the light source device 100, and has a transparent characteristics optimal for luminescence spectrum of the light incident to the optical filter 71. More specifically, the optical filter 71 attenuates the luminescence spectrum of the incident light in a particular wavelength band. By this, the luminescence spectrum of the light emitted from the output surface of the light guide 14 is adjusted.

In the present embodiment, the optical filter 71 is a multi-layer film type in which many thin films having different refractive indexes are laminated. For example, the optical filter 71 may be an air mass filter. Such an air mass filter includes many dielectric multilayer films and has an incident angle dependency. Therefore, in order to fully utilize capacity of the optical filter 71, it is necessary to enter light with high directivity into the optical filter 71. In general, it is preferable that the light entering the optical filter 71 has directivity controlled to be within 30 degrees. It is further preferable that the light entering the optical filter 71 has directivity controlled to be within 20 degrees. By entering the light with directivity controlled to be within 20 degrees or 30 degrees, performance of the optical filter 71 can be improved sufficiently. In the present embodiment, the directivity of the light emitted from the light source devices 100 is controlled to be within 30 degrees, whereby the light emitted from the optical filter 71 can have luminescence spectrum closer to spectrums to natural solar light.

Figure 11:
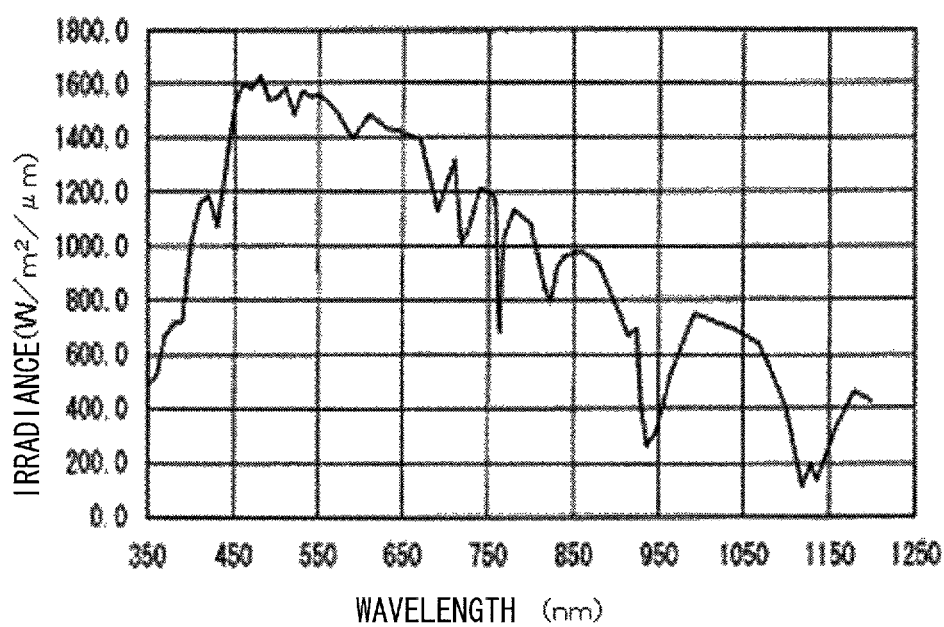
FIG. 11 is a view illustrating standard solar light spectrum to be targeted.
Figure 12:
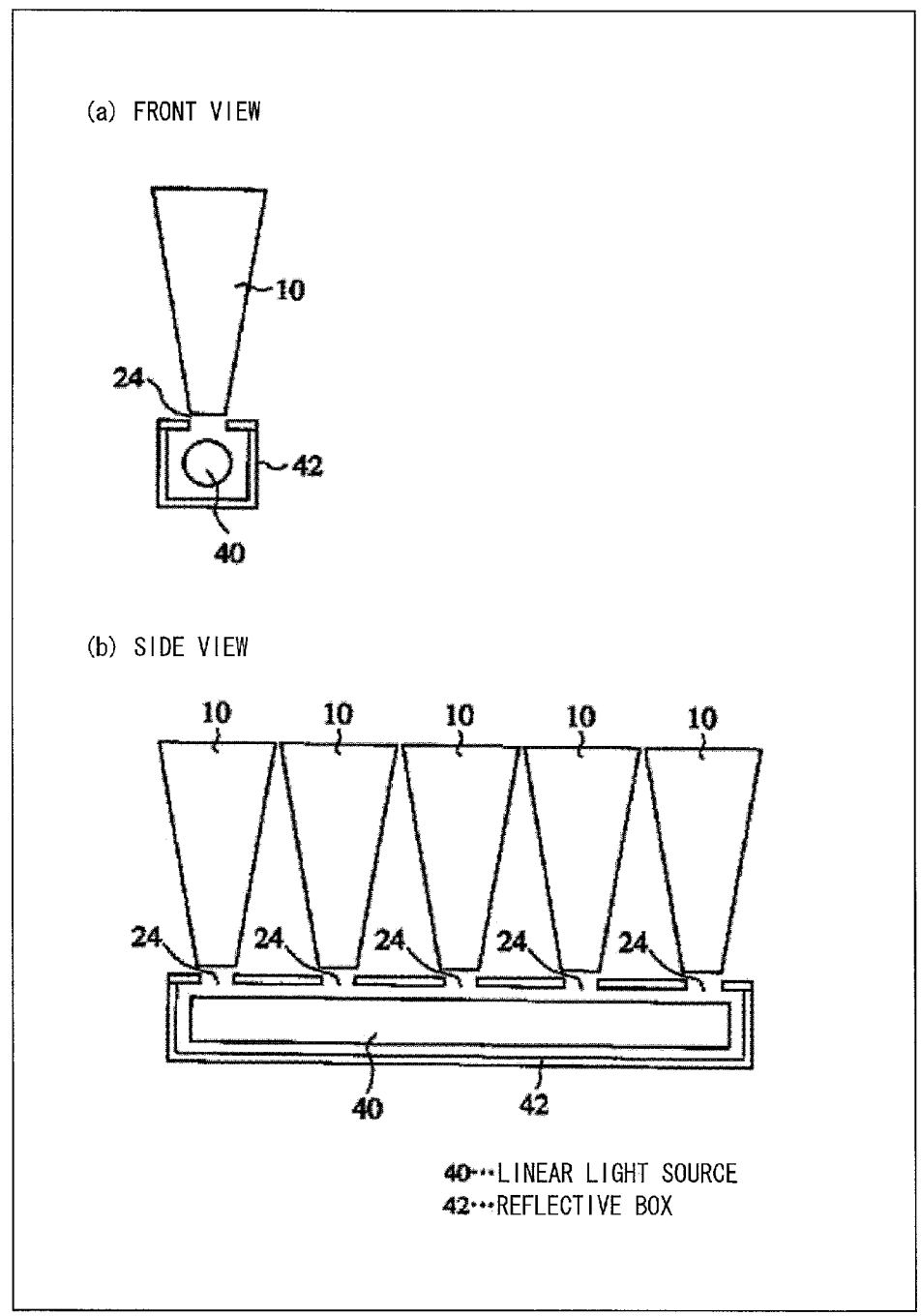
FIG. 12 is a schematic cross sectional diagram illustrating a conventional light source device.

FIG. 11 is a view illustrating standard solar light spectrum (JIS C8941). It is preferable that the light having passed through the optical filter 71 has a luminescence spectrum as close to the standard solar light spectrum (JIS C8941) as possible. Especially, it is preferable that a difference between the luminescence spectrum of the light having passed through the optical filter 71 and the standard solar light spectrum is +/− less than 25%. It is more preferable that a difference between the luminescence spectrum of the light having passed through the optical filter 71 and the standard solar light spectrum is +/− less than 5%.

Moreover, it is preferable that the optical filter 71 is slightly larger than the output surface 17 of the light guide 14, so that all of the light emitted from the light guide 14 can be received by the optical filter 71. This is because light not entering the optical filter 71 will not be subjected to the luminescence spectrum adjustment and will affect the luminescence spectrum of whole light if the light not subjected to the luminance spectrum adjustment enters the optical path in the downstream of the optical filter 71.

The light having passed through the optical filter 71 travels to the reflective mirror 72 provided at 45 degrees with respect to the optical filter 71. The reflective mirror 72 reflects the incident light to one end (incident surface) of the light guide plate 73.

The light guide plate 73 is made from quartz glass, for example. The light having entered the light guide plate 73 is propagated through the light guide plate 73 while being repeatedly reflected on the outer wall of the light guide plate 73. The light guide plate 73 has many reflective grooves 74 (light reflecting means) inside thereof, for example. The light entered the light guide plate 73 enters and is reflected on a reflective groove 74 during the propagation inside the light guide plate 73. This causes propagation angle of the light to be out of the total reflection condition of the Snell's law, thereby causing the light to emit out of the light guide plate 73. As such, the light guide plate 73 has the function of propagating the incident light through inside thereof, and reflecting the propagating light by the reflective grooves 74 so as to emit the light outside.

The reflective grooves 74 may be a wedge-like shaped or may have another shape. Further, the light reflecting means may be printing formed by printing a scattering material on the surface of the light guide plate 73, instead of the reflective grooves. In this case, the light propagating inside the light guide plate 73 is scattered by the scattering materials inside the printing when the light enters the printing. As a result of the scattering, the light is emitted out of the light guide plate 73. As one alternative to the use of printing, the same effect can be attained by processing the surface of the light guide into a scattering surface by microfabrication using laser or the like. Any technique can be adopted, provided that a traveling direction of the light propagating inside the light guide plate 73 is changed to cause the light to be out of the total reflection conditions, thereby to emit the light out of the light guide plate 73.

The simulated solar light irradiation device 700 irradiates simulated solar light to an irradiation target from the surface of the light guide plate 73 finally. In the present embodiment, the simulated solar light is irradiated in a direction along the longitudinal axis of the light guide 14, that is, in parallel with the z axis illustrated in FIG. 10. To irradiate the simulated solar light, the simulated solar light irradiation device 700 utilizes the reflecting grooves inside the light guide plate 73, as described above. In irradiating the simulated solar light, the light guide 73 would emit the light in directions opposite to the irradiation target. By providing a reflective board (not illustrated) behind the light guide 73, the light can be reflected by the reflective board toward the irradiation target.

As illustrated in FIG. 10, the simulated solar light irradiation device 700 includes the two light source device 100. More specifically, one of the light source devices 100 is provided on one side (left-hand side of FIG. 10) of a housing of the simulated solar light irradiation device 700 whereas another one of the light source devices 100 is provided on one side (right-hand side of FIG. 10) of the housing of the simulated solar light irradiation device 700. In association with them, the two optical filters 71 and two reflective mirrors 72 are provided. The light from one of the light source devices 100 is introduced into one end of the light guide plate 73, whereas the light from the other one of the light source devices 100 is introduced into the other one end of the light guide plate 73. This increases intensity of the simulated solar light irradiated from the simulated solar light irradiation device 700. Moreover, this makes it possible to easily regulate luminance unevenness of the light irradiated on the irradiation target.

Moreover, the simulated solar light irradiation device 700 has a certain depth in the depth direction (x axis direction) of the FIG. 10. The simulated solar light irradiation device 700 may be configured by arranging a plurality of the light source devices 100 along the depth direction of the FIG. 10 according to how large an area of the irradiation target is.

The present invention is not limited to the present example in which the light guide plate 73 is used to irradiate the simulated solar light to the irradiation target. For example, a light diffusing member constituted by a plurality of lenses or the like may be provided above the optical filter 71, so as to irradiate uniformly diffused light onto the irradiation target.

It should be understood that the embodiments and examples disclosed herein are illustrative only but are not restrictive of the scope of the invention. The scope of the invention is described in the appended claims, but not in the explanation above, and is intended to encompass equivalents to the claims and all changes and modifications included within the scope of the claims.

The present invention is not limited to the embodiments described above. It is to be understood that various changes and modifications may be made by those skilled in the art within the scope of the invention as expressed in the appended claims. That is, new embodiment can be made by combining appropriately changed or modified technical means within the scope of the inventions as expressed in the claims. That is, the specific embodiments described in the Embodiments are merely for explaining the technical content of the present invention, and the invention shall not be interpreted as being limited to the specific embodiments. The invention may be readily carried into effect with various such modifications and changes without departing from the spirit of the invention within the scope of the following claims.

SUMMARY OF THE PRESENT INVENTION

As described above, a light source device according to the present invention is a light source device for emitting concentrated light, which is prepared by concentrating light emitted from a light source, comprising: the light source; a reflective box in which the light source is provided; a plurality of light guides having a circular column shape or a polygonal column shape and having two end surfaces being different in area; and light separating means, the reflective box having a plurality of openings, each opening being provided with one of the light guides in such a way that the end surface smaller in area faces the light source, and each light separating means being provided at a position between the adjacent ones of the openings.

Moreover, the light source device according to the present invention is preferably configured such that the light source includes a plurality of light emitting sections, and each light separating means is provided at a position between the adjacent ones of the light emitting sections.

Moreover, the light source device according to the present invention is preferably configured such that the light separating means is a partition board having a board-like shape, and the partition board has a hole for passing the light source therethrough.

Moreover, the light source device according to the present invention is preferably configured such that the light separating means is configured to allow adjustment in light amount or wavelength characteristic of the light coming from the light source.

Moreover, the light source device according to the present invention is preferably configured such that the light separating means is a reflective board or is covered with reflective coating on its surface facing the light source.

REFERENCE SIGNS LIST

100: Light source device
10, 10a, 10b: Light emitting section
11: Light source
12: Reflective box
13, 13a, 13b: Openings
14, 14a, 14b: Light guide
15: Partition board
16: Incident surface
17: Output surface
18: Incident light
19: Outgoing light
22: Reflective box
25, 25a, 25b: Light guide
26, 26a, 26b: Incident surface
27, 27a, 27b: Output surface
32, 32a, 32b: Reflective box
33: Hole
700: Simulated solar light irradiation device
71: Optical filter
72: Reflective mirror
73: Light guide
74: Reflective grooves

The invention claimed is:

1. A light source device for emitting concentrated light, which is prepared by concentrating light emitted from a light source, comprising:
   the light source;
   a reflective box in which the light source is provided;
   a plurality of light guides having a circular column shape or a polygonal column shape and having two end surfaces being different in area; and
   light separating means,
   the reflective box having a plurality of openings,
   each opening being provided with one of the light guides in such a way that the end surface smaller in area faces the light source, and
   each light separating means being provided at a position between the adjacent ones of the openings.

2. The light source device as set forth in claim 1, wherein:
   the light source includes a plurality of light emitting sections, and
   each light separating means is provided at a position between the adjacent ones of the light emitting sections.

3. The light source device as set forth in claim 1, wherein:
   the light separating means is a partition board having a board-like shape, and
   the partition board has a hole for passing the light source therethrough.

4. The light source device as set forth in claim 1, wherein:
   the light separating means is configured to allow adjustment in light amount or wavelength characteristic of the light coming from the light source.

5. The light source device as set forth in claim 1, wherein:
   the light separating means is a reflective board or is covered with reflective coating on its surface facing the light source.

6. A light source device for emitting concentrated light, which is prepared by concentrating light emitted from a light source, comprising:
   the light source having a plurality of light emitting sections,
   reflective boxes inside of which contains the light source,
   a plurality of light guides having a circular column shape or a polygonal column shape and having two end surfaces being different in area; and
   each reflective boxes having a plurality of openings and having a hole or holes for passing the light source therethrough,
   the reflective boxes and the light guides being equal to the light emitting sections in number, and
   each opening being provided with one of the light guides in such a way that the end surface smaller in area faces the light source.

7. A simulated solar light irradiation device for irradiating simulated solar light toward an irradiation target, comprising:
   a light source device as set forth in claim 6, and
   a spectral modifying member provided at a position at which the spectral modifying member receives the light emitted from the light source device, the spectral modifying member being configured to attenuate a spectrum in a particular wavelength band in the received light, and emit the light thus attenuated in the spectrum.

8. A simulated solar light irradiation device for irradiating simulated solar light toward an irradiation target, comprising:
   a light source device as set forth in claim 1, and
   a spectral modifying member provided at a position at which the spectral modifying member receives the light emitted from the light source device, the spectral modifying member being configured to attenuate a spectrum in a particular wavelength band in the received light, and emit the light thus attenuated in the spectrum.

* * * * *